Dec. 28, 1954    M. P. CHAPLIN    2,697,967
PULP ARTICLE TRANSFER AND RESHAPING MACHINE
Filed Jan. 17, 1950    9 Sheets-Sheet 2

INVENTOR
MERLE P. CHAPLIN
BY Almon S. Nelson
ATTORNEY

INVENTOR
MERLE P. CHAPLIN
BY [signature]
ATTORNEY

INVENTOR
MERLE P. CHAPLIN
BY
ATTORNEY

Dec. 28, 1954 M. P. CHAPLIN 2,697,967
PULP ARTICLE TRANSFER AND RESHAPING MACHINE
Filed Jan. 17, 1950 9 Sheets-Sheet 5

INVENTOR
MERLE P. CHAPLIN
BY *Almon S. Nelson*
ATTORNEY

Dec. 28, 1954  M. P. CHAPLIN  2,697,967
PULP ARTICLE TRANSFER AND RESHAPING MACHINE
Filed Jan. 17, 1950  9 Sheets-Sheet 6

ATTORNEY
MERLE P. CHAPMAN
BY Almon S. Nelson
INVENTOR

United States Patent Office 2,697,967
Patented Dec. 28, 1954

2,697,967

PULP ARTICLE TRANSFER AND RESHAPING MACHINE

Merle P. Chaplin, South Portland, Maine, assignor to Chaplin Corporation, South Portland, Maine, a corporation of Maine Application January 17, 1950, Serial No. 138,988

8 Claims. (Cl. 92—59)

This invention relates to the manufacture of molded pulp articles and is directed, more particularly, to novel apparatus for providing such articles, during the course of their manufacture, with integral reinforcing thickened edges. The invention also includes novel methods of operating apparatus of this character, generally.

My Patent No. 2,388,828 discloses a machine for manufacturing pulp articles by suction forming blanks for said articles from pulp in a forming unit, then transferring the thus formed blanks, while in wet condition, by means of a transfer unit to a drying unit where they are dried and finished prior to delivery from the machine. The forming unit provides on the molded pulp blank a marginal portion protruding beyond the body of the article and the transfer unit manipulates this marginal portion, during the transfer of the article from the forming unit to the drying unit, into a thickened reinforcing edge.

The present invention is directed primarily to the transfer unit and to novel mechanism whereby the shaping of the protruding marginal portion is accomplished.

The apparatus of this invention provides for the individual handling of articles received from the forming unit by the transfer unit and also allows of the simultaneous re-shaping of as many articles as the size of the unit and the smaller size of the individual articles will permit.

Features of the invention, other than those adverted to, will be apparent from the herinafter detailed description and appended claims when read in conjunction with the accompanying drawings.

The accompanying drawings illustrate different practical embodiments of the invention, but the constructions therein shown are to be understood as illustrative, only, and not as defining the limits of the invention.

Figure 1:
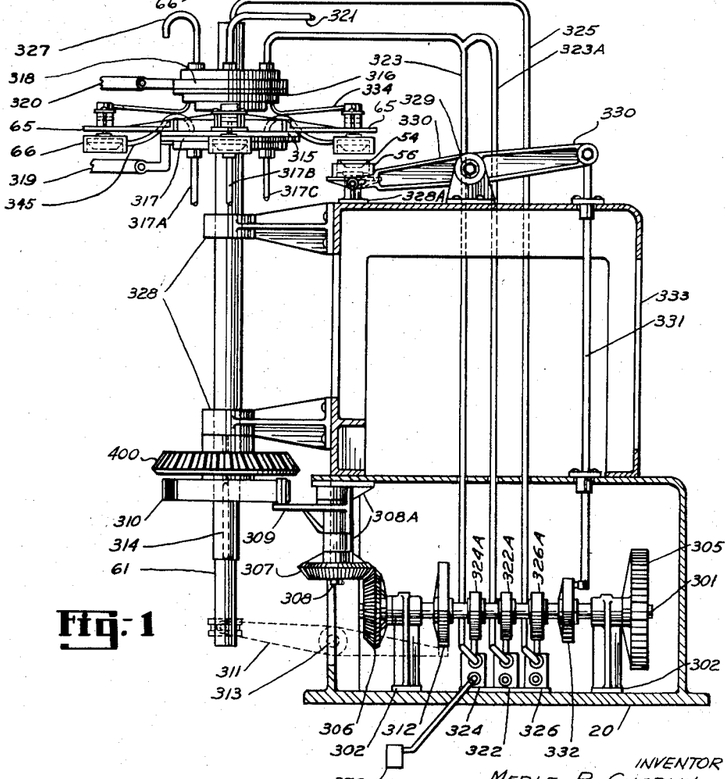
Figure 1 is an elevation, partly in section, showing transfer dies, reshaping mechanism, a cam shaft and poppet valves.
Figure 2:
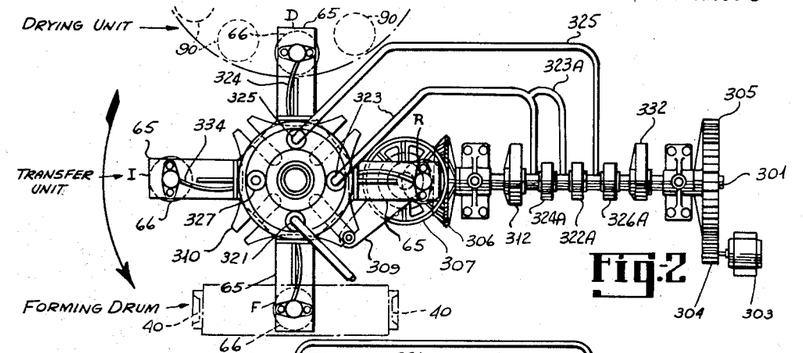
Figure 2 is a plan view of the structure shown in Figure 1, illustrating in dot and dash lines its relation to the drum of the forming unit and the drying unit.

Figure 2 of the drawings shows in dot and dash lines a forming drum having on its periphery a plurality of suction forming dies 40 as in said prior patent. This drum is rotated step by step to pass the dies 40 successively through a liquid pulp mixture in a vat or tank to suction form article blanks thereon and raise said dies in succession into horizontal position above the tank. From a forming die thus positioned, the transfer unit, shown in full lines in Figures 1 and 2, receives or picks-up the thus formed article blank and, after reshaping the marginal portion thereof into a thickened reinforcing edge, delivers the article to a drying unit, shown in dot and dash lines in Figure 2, which carries a plurality of drying dies indicated 90 as in said prior patent. After an article has been deposited on the drying die as stated, it is dried and finished as set forth in said patent.

The forming unit, transfer unit and drying unit are geared together in any suitable manner and they are rotated about their individual axes in an intermittent manner, i. e., step by step, with periods of rest or dwell between consecutive arcuate movements of each of them. They are timed to thus operate in synchronism and the transfer of articles from the forming unit to the transfer unit and from the transfer unit to the drying unit is carried out during periods of dwell, i. e., while the several units are at rest.

The present invention, as herein before stated, is directed primarily to the transfer unit. This unit, as shown in Figures 1 and 2, is provided with a base frame 20 supporting a cam and poppet valve shaft 301 on bearings 302. This shaft is rotated at a constant speed by any suitable means, e. g., a motor 303, connected by a pinion 304 to a gear 305 on said shaft.

On the shaft 301 is a bevel gear 306 meshing with a bevel gear 307 of the same size on a vertical shaft 308, mounted for rotation in bearings 308A, to which shaft is fixed a Geneva arm 309 for engagement with a Geneva wheel 310. This Geneva wheel is slidably mounted on shaft 61, simultaneous rotation of wheel and shaft being provided by a sliding key connection 314, so that the shaft 301 serves to rotate the upright shaft 61 intermittently, while permitting up and down sliding movement of the shaft 61. In the showing of Figures 1 and 2, the shaft 61 is rotated ¼ of a revolution at each operation of the Geneva drive.

Vertical movement is imparted to the shaft 61 by a lever 311, pivoted on the base 20 at 313. One end of this lever projects between fixed collars on the shaft 61, while the other end of the lever carries the follower of a cam 312 on the drive shaft 301. The shaft 61 is mounted for rotation and vertical reciprocation in bearings 328 mounted on a frame 333.

Carried by the upper portion of the shaft 61 and rigid with it are four radial transfer arms 65 and also fixed on said shaft are two rotary selector valve members 315 and 316 which are respectively adapted to cooperate with two fixed valve members 317 and 318. The latter are held against rotation by suitable stop connections 319 and 320, so that the valves 315 and 316 rotate with the shaft while the valve members 317 and 318 are locked against rotation, whereby ports in each of these cooperating valve couples are successively brought into register with one another as the shaft 61 is rotated. The relationship between these fixed and rotatable valves is graphically illustrated in schematic Figure 1A.

Figure 3:
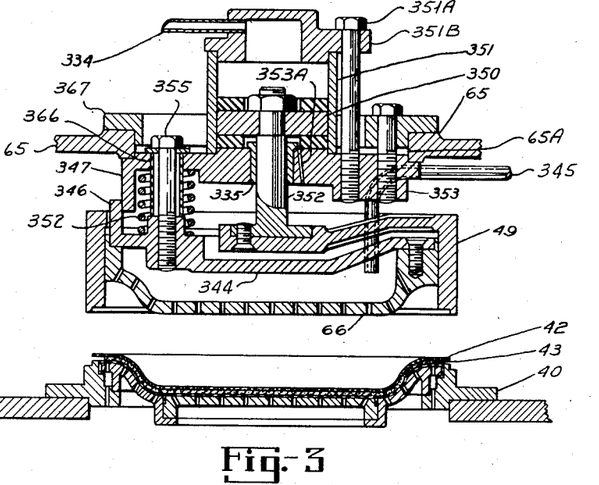
Figure 3 shows the transfer die of the transfer unit in a position corresponding to the station F in Figure 2, as said die is brought into alinement with a forming die, with the transfer reshaping ring which is associated with the transfer die in lowered position.

Mounted near the outboard end of each of the four transfer arms 65 is a transfer die assembly. These four die assemblies are all alike, so that a description of one will suffice for all. In Figure 3, which shows one of them, the transfer arm 65 is provided with an opening 65A. Beneath this opening and rabbeted into it is a carrier plate 353 and rabbeted into said opening from the top thereof is a clamp plate 367. A plurality of screws 368 clamp these plates together on the interposed transfer arm. The center of the clamp plate 353 is provided with an opening having therein a bushing 335 in which is guided an upright piston rod 352 to the upper end of which is fixed a piston 350. This piston operates within a cylinder 351 secured to the carrier plate 353 by a plurality of screws 351A passing through the cylinder head 351B. The cylinder head is made hollow and a pipe or duct 334 enters the same to supply compressed air or suction, i. e., "plus" or "minus" atmospheric pressures, to the interior of the cylinder above the piston 350.

Mounted on the lower end of the piston rod is a spider rigid with a transfer reshaping ring 49 embracing the transfer die 66 for axial sliding movement with respect thereto. The transfer die is closed at its top, to provide a chamber therein, by a cover plate 344 supported on the carrier plate 353 by a plurality of retaining bolts 355 which pass through spacers 366 and are embraced by springs 352. The transfer die is thus suspended from the carrier plate 353, but may yieldably move upwardly in the direction of said plate by compressing the springs 352. Under normal conditions, however, the springs maintain the transfer die at the lowermost position permitted by the retaining bolts 355. The transfer die 66 is provided with perforations or slots, either with or without mesh covering, and plus or minus atmospheric pressures may be introduced into the interior of the die chamber through a pipe or duct 345.

When four transfer die assemblies of the character shown in Figure 3 are supported on the four arms 65 of the transfer unit, the rotation of the transfer unit in increments of 90 degrees provides for movement of each die assembly to four very definite positions or stations of rest in succession. These stations are indicated in Figure 2 as F, the pick-up station, R, the reshaping station, D, the delivery station, and I, the inspection station. When a transfer die assembly is at station F, it is directly above one of the forming dies 40 of the forming drum. When at station R, it will be above a fixed reshaping die 54 fixedly mounted on a bracket 328a on the frame 333. When at station I, it will be in a condition for inspection, as hereinafter explained.

Figure 6:
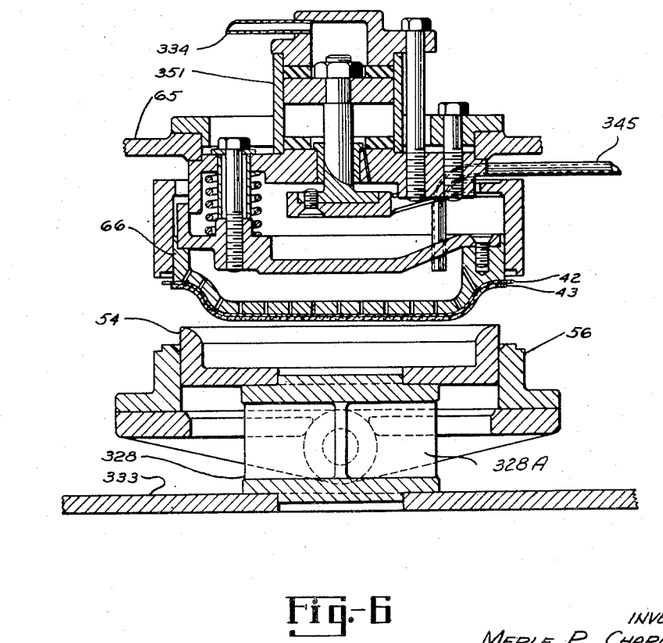
Figure 6 shows the relation of the transfer die and a fixed reshaping die, after the transfer die has been moved to station R of Figure 2, with the two dies initially vertically spaced apart.

The fixed reshaping die is embraced by a reshaping ring 56, shown in detail in Figure 6. Said ring is provided at its opposite sides with trunnions engaged by one end of a rocker 330 mounted on a bracket 329, fixed to the frame 333. The other end of the rocker is connected to the upper end of an operating rod 331, having at its lower end a cam follower coacting with a cam 332 on the drive shaft 301. Also fixed on the drive shaft 301 are three cams 324A, 322A and 326A which control, respectively, poppet valves 324, 322 and 326 mounted on the base 30 (Figure 1).

Figure 1A:
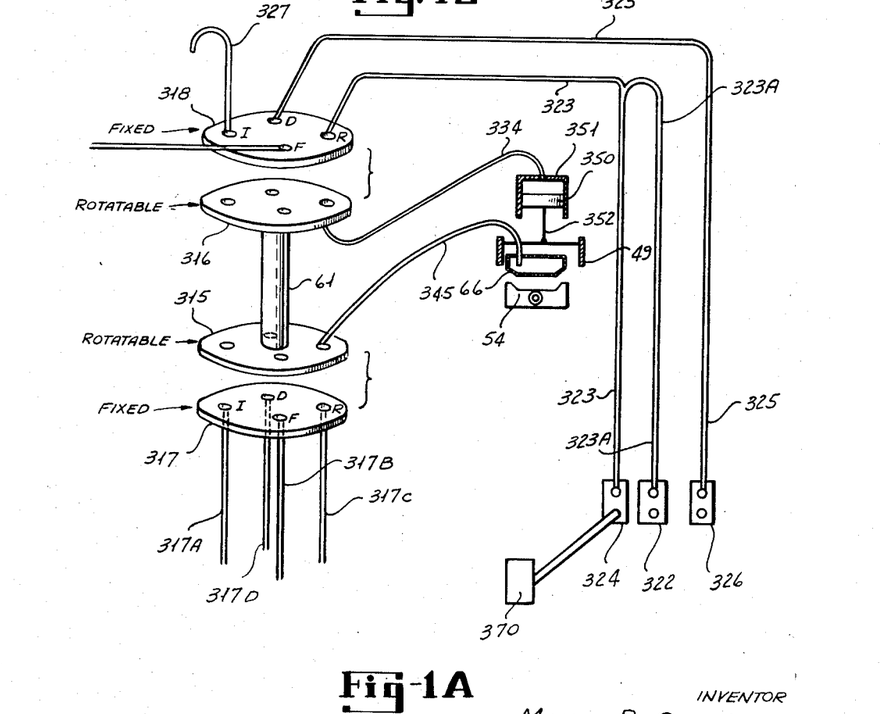
Figure 1A is a schematic showing of the pneumatic system of this invention.

The pneumatic system, which interlocks the several parts of this transfer unit for timed operation, is shown schematically in Figure 1A. In this figure, only one transfer die assembly is shown, with pneumatic connections to one port of each of the rotatable valves 315 and 316, but it should be understood that the three other ports of each of these rotatable valves are similarly connected to the transfer die assemblies of the other three transfer arms 65.

Thus, in Figure 1A, it will be noted that one port of the rotatable valve 315 is connected to the pipe or duct 345 leading to the chamber of the transfer die 66. At station R, the corresponding port of the fixed valve 317 is connected by a pipe 317C to any appropriate and conventional valve box such as is commonly used in suction molding machines and operated by some movable shaft or part to supply suction or air under pressure to the perforate die according to the timing of the machine. Compressed air and suction for each of the pipes 317A, 317B, 317C and 317D is controlled in the same manner and need not be further detailed here, as such control boxes are well known in this art.

With the port of the rotatable valve 316, shown at station R in Figure 1A, is connected a feed pipe or duct 334 which leads to the cylinder 351. The corresponding port port at station R in the fixed valve 318 is connected by a supply pipe or duct 323 to the poppet valve 324 and this pipe 323 has a branch line 323A which leads to the poppet valve 322. From the port of the fixed valve 318 at station D, a supply pipe 325 or duct leads to the poppet valve 326. Of these poppet valves, 324 is connected to a pressure relief valve 370, 322 is connected to a source of compressed air, and 326 is connected to a source of suction. The port of the fixed valve 318 at station I is vented to the atmosphere through a pipe or duct 327.

Having in mind the pneumatic system shown in Figure 1 and schematically illustrated in Figure 1A, the operation of the apparatus of this invention will now be explained.

The forming drum, transfer shaft 61 and drying unit are interlocked for intermittent synchronous rotation. The interlocking of these forming, transfer and drying units may be thru gearing connecting them in any appropriate manner. I may for example, connect them as in my said prior patent or the forming and drying units may be connected by gearing to and be driven from the gear 400 rotatable with shaft 61 (Figure 1).

With such interlocking, each rotative step of this shaft, will cause each of the four transfer die assemblies to be stepped 90 degrees from one station to the next. At the same time the forming drum is rotated one step to move a forming die 40 (with wet formed article blank thereon) to "pick off" station F. Simultaneously the drying die unit is rotatively stepped to move a drying die to the "delivery" station D. Then the rotation of all these parts ceases and the parts remain at rest for a period of dwell, during which certain operations, hereinafter described, are carried out before the next rotative stepping operation of these parts.

Thus, let it be assumed that one of the forming dies 40 at station F and that the transfer die of one of the arms 65 is also at the same station and spaced above said forming die, as shown in Figure 3. On this forming die is supported a wet formed article blank embodying superimposed sections 42 and 43, the marginal portions of which are to constitute the reinforcing edge when properly reshaped. When the transfer die is at this station F, the transfer reshaping ring 49 is in the lowered position shown in this figure, the cylinder 351 having been previously vented through the pipe 327 and the lower portion of the cylinder being vented through a passage 353A. Such being the case, the ring 49 will have gravitated into said lower position.

Figure 4:
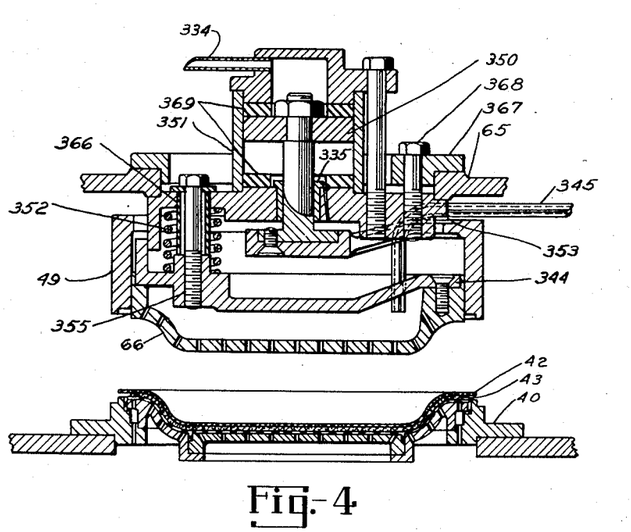
Figure 4 shows the same general relation of the parts as in Figure 3, but with the transfer reshaping ring elevated.

As the dies 66 and 40 move into station F, the rotatable valve 316 (Figure 1A) will rotate into position to register the port of duct 334 with the port of such duct 321 and the resulting suction in cylinder 351 will elevate the ring 49 as shown in Figure 4.

Figure 5:
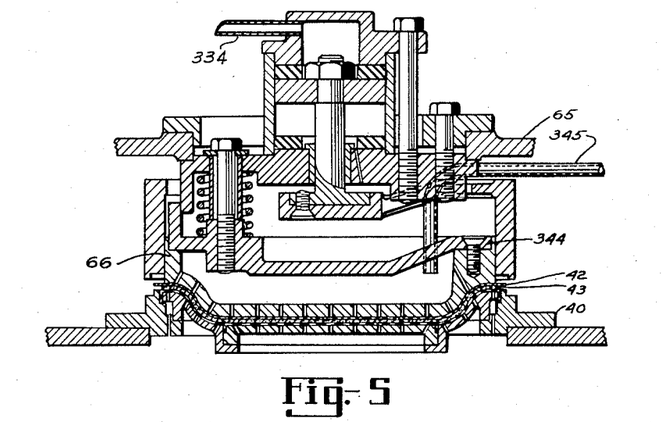
Figure 5 shows the transfer die in contact with an article blank on the forming die, while the parts remain at station F.

This having been accomplished, the cam 312 on the cam shaft 301 will act through the lever 311 to lower the shaft 61 and thus move the transfer die assembly downwardly into the position of Figure 5 to bring the transfer die 66 into engagement with the article blank 42—43 on the forming die 40, as shown in Figure 5. As this takes place, suction is communicated from the pipe 317B (at station F) through the corresponding port of the fixed valve 317 and the registering port of the rotatable valve 315 and through pipe 345 and at the same time suction back of the forming die is discontinued and a slight puff of pressure may be applied to free the article from the forming die while it is sucked onto and held by the transfer die 66.

As soon as this operation has taken place, the timing of the machine insures that the cam 312 will again elevate the transfer shaft 61 and lift the transfer die, with the article thereon, free from the forming die.

Immediately thereafter the Geneva movement acts upon the transfer shaft 61 to rotate the transfer die (with article thereon) from station F to station R, i. e., to the position indicated in Figure 6, above the stationary reforming die 54 and free from contact therewith. During this movement, the upper part of the cylinder will remain sealed so that the transfer reshaping ring will stay in this elevated position while suction is retained within the transfer die to hold the article blank thereon.

Figure 7:
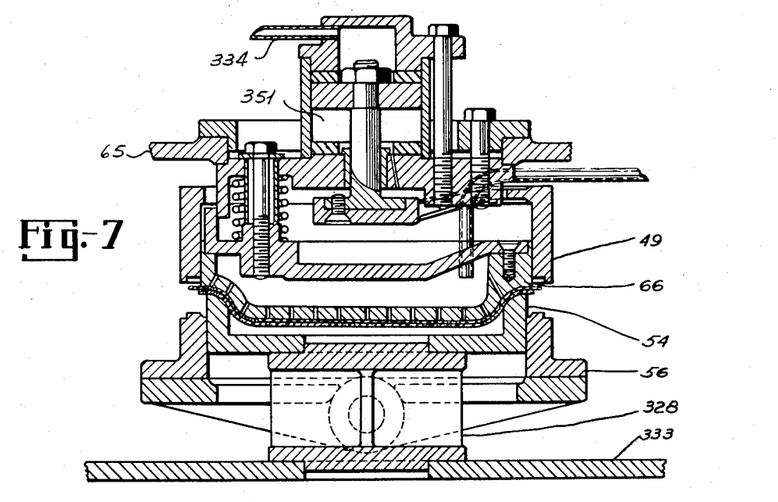
Figure 7 is a view corresponding to Figure 6, but with the dies engaged with one another to hold a formed article blank between them preliminary to shaping the marginal portions of the blank.

The cam 312 thereupon acts upon the transfer shaft 61 to lower the same and bring the article blank into contact with the stationary reforming die 54, as shown in Figure 7. At this time the transfer reshaping ring 49 remains elevated, while the reshaping ring 56 of fixed die 54 is in lowered position, so that neither of these rings engage with the blank, as will be apparent from Figure 7. The article is, however, clamped near its margins between the fixed reshaping die 54 and the transfer die. When thus gripped and held, the fixed reshaping die does not engage with the entire under surface of the still wet blank. Only the upstanding marginal portion of this reshaping die engages the article, so that the central portion of the body of the article blank is not compressed when in this position, only an annular zone spaced from the margin of the blank being gripped to hold the article in position while the reshaping operation next to be described is carried out.

Figure 8:
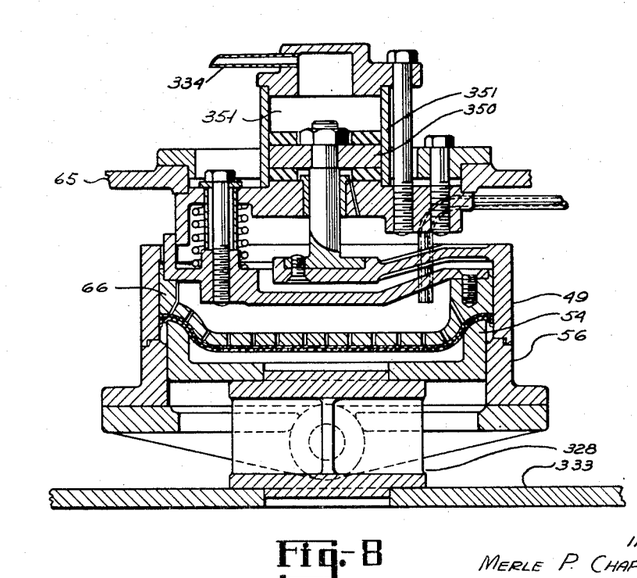
Figure 8 shows the dies in the same relation as in Figure 7, but with the transfer shaping ring lowered to carry out the first step of shaping the margin of the blank.
Figure 9:
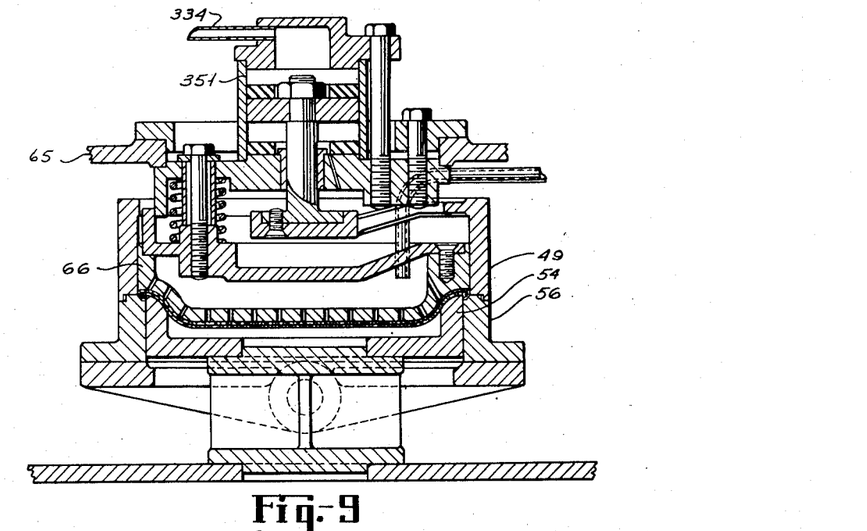
Figure 9 shows the dies in the same relation at station R as in Figure 8, but with the reshaping ring of the fixed die elevated to complete the reshaping operation to thereby produce on the blank a thickened edge structure.

As the article is thus clamped in position, as indicated in Figure 7, pressure is admitted to the cylinder 351 through pipe 334 for the corresponding port of the rotatable valve 316 is registered with the corresponding port of the fixed valve 318, connected by pipes 323 and 323A to the poppet valve 322. This poppet valve is operated at this time by the cam 322A to open said poppet valve and admit compressed air from any suitable source of supply into the cylinder 351 through the connections stated, thereby causing the ring 49 to be forced downwardly to engage that marginal portion of the article which protrudes beyond the periphery of the transfer die and wipe that portion downwardly in the carrying out of the initial reshaping step as illustrated in Figure 8. The upper ring (transfer reshaping ring 49) comes to rest upon the upper edge of the lower ring (reforming shaping ring 56) with which it preferably interfits and, immediately thereafter, the cam 332 acts upon the rocker 330 to elevate the lower ring 56 into the position shown in Figure 9. In so doing the lower ring carries the upper ring 49 upwardly with it, to facilitate which the cam 324A has acted upon the poppet valve 324 to relieve excess pressure above the piston through pipe 323 and the pressure relief valve 370. By the time both rings have been elevated, as stated, the marginal portion of the blank will have been reshaped and compressed into final shape in the closed space or chamber formed between the rings and dies.

It takes some little pressure to wipe the marginal portion of the blank from the position shown in Figure 7 to the position shown in Figure 8 and inasmuch as the ring 49 is lifted by the ring 56, it is desirable to vent the cylinder 351 through the pressure relief valve as stated while maintaining sufficient pressure in that cylinder to insure that the rings 49 and 56 move upwardly together and remain in contact with one another. The ring 56 is forced upwardly in the manner described by the rocker 330 under sufficient power imparted by the cam 332 to shape and compress the protruding margin of the article blank into substantially its final form of the thickened reinforcing edge while the article blank remains in wet condition. Meanwhile suction within the chamber of the transfer die is continued to hold the blank firmly on the transfer die, whereby the transfer die with the reshaped article may now be elevated into the position of Figure 10. This is accomplished by operation of the cam 312 which then elevates the transfer shaft 61.

Figure 10:
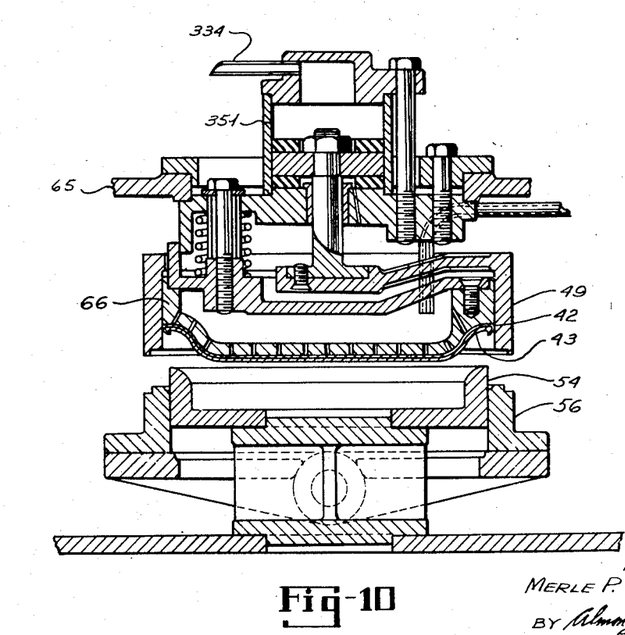
Figure 10 shows the parts still at station R with the transfer die elevated and the shaped article supported thereon above and out of contact with the fixed reshaping die.

As the transfer die is lifted from the fixed reshaping die 54 at station R, the pressure remaining within the cylinder 351 is still sufficient to lower the upper ring 49 so that the transfer die (with the shaped article thereon) leaves said reshaping die with the parts as shown in Figure 10, the lower ring 56 having been withdrawn by the cam 332, as illustrated in this figure.

Figure 11:
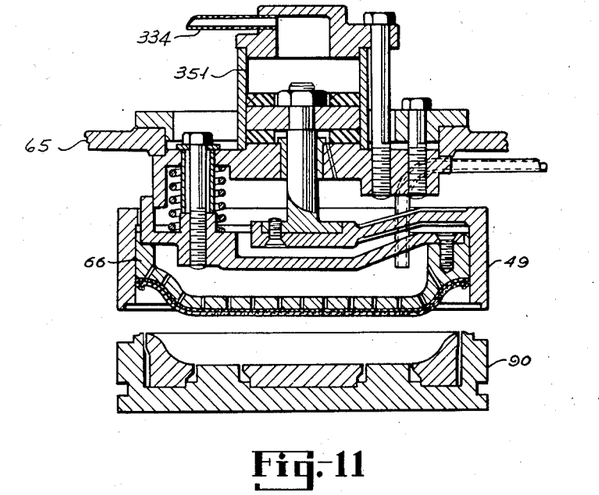
Figure 11 shows the position of the transfer die after it has been moved into vertical alinement with one of the drying dies at station D with the transfer reshaping ring in lowered position.

The Geneva wheel 310 is thereupon again operated to turn the rotatable valves 315, 316 and the transfer die through 90 degrees to station D, as shown in Figure 11. At this station the transfer die is above and in line with one of the drying dies 90. The cam 312 thereupon acts upon the lever 311 to lower the shaft 61 and bring transfer die into the position shown in Figure 12. The transfer die comes to rest in this position with the article thereon fairly close to but free from contact with the drying die 90. Meanwhile the lower edge of the transfer reshaping ring 49 has engaged with a stop 49B of the drying die, as shown in Figures 12 and 12A.

Figures 12, 12A:
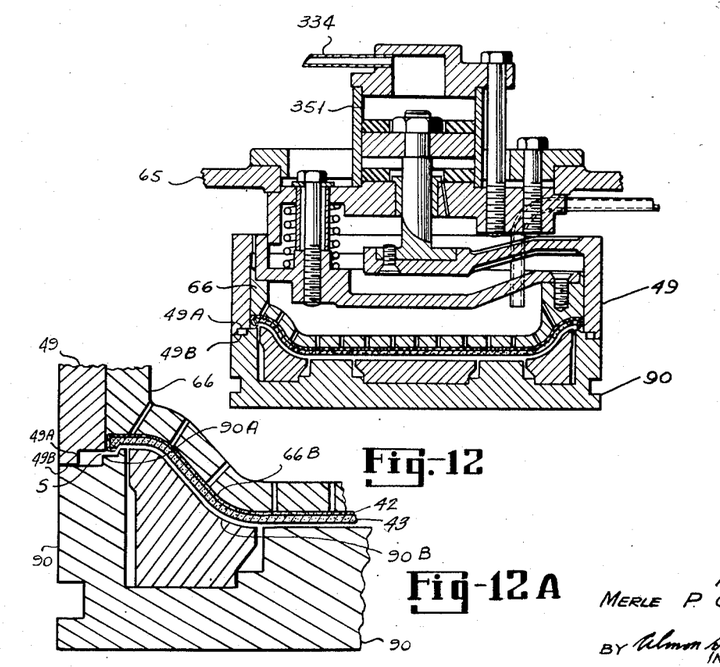
Figure 12 shows the parts as in Figure 11, but with the transfer die lowered preparatory to depositing the reshaped article on the drying die. The transfer reshaping ring has been partially raised, but still retains the reshaped edge in position.
Figure 12A is an enlarged fragmental section of certain cooperating parts in the relation shown in Figure 12.

In order to insure the retention of the reshaped edge of the article until the article is in position to be delivered from the transfer die to the drying die, the transfer die ring 49 is provided with a rabbet or recess 49A slightly deeper or greater than the height of the edge of the drying die 90 above the surface of the drying die at its outer diameter as seen in Figure 12A. As there shown, the inside diameter of the transfer die ring 49 is slightly less than the outer diameter of the drying die surface at the molding reinforced edge area, so that when the transfer die ring 49 and the transfer die 66 are in a position to transfer the article from the transfer die to the drying die, the reshaped edge is held in the position shown in Figure 12A, with the outer diameter of the article contacting face 66B of the transfer die 66 slightly inside the outer diameter of the article contacting face 90B of the drying die.

As shown in this figure, a slight space S is left between the inner edge of the ring 49 and the corner 90A of the die 90 to avoid any damage to the corners of the ring or die at this point and to eliminate any possibility of mechanical wear. As the transfer die is lowered, the ring 49 is lifted by the die 90 to provide a clearance at space S, thereby avoiding the necessity of any extremely accurate adjustment in the relative positioning of any transfer die with the drying die.

Figure 13:
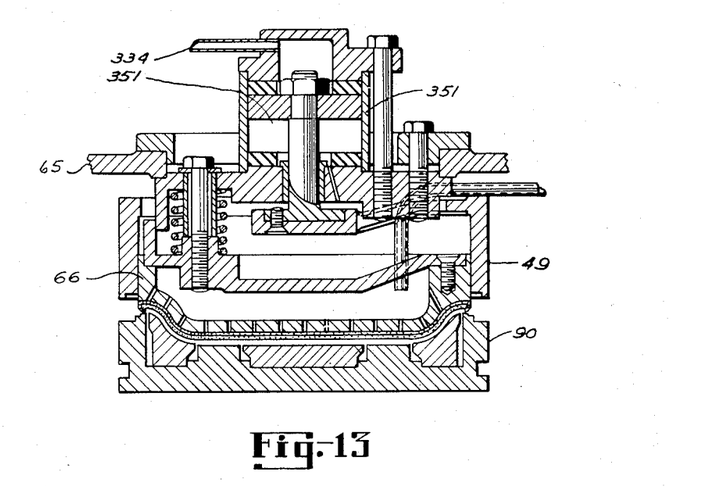
Figure 13 shows the dies in the same position as Figure 12 at position D, but the transfer reshaping ring has been fully elevated.
Figure 14:
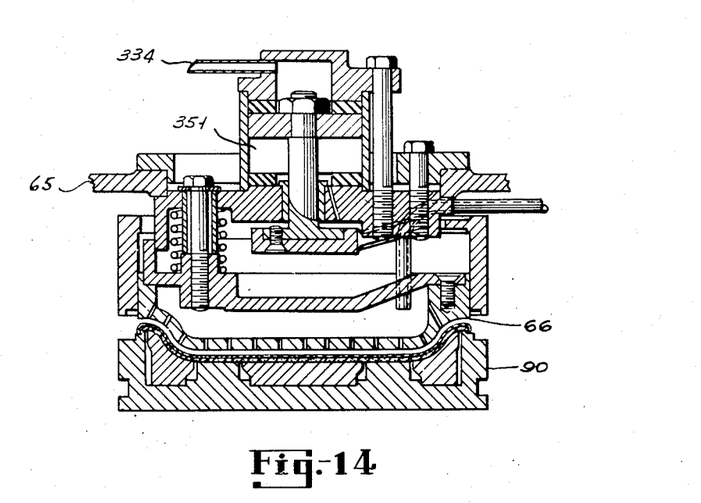
Figure 14 shows the dies in the same position as Figure 13, with the article transferred from the transfer die to the drying die.

Just an instant before the article is transferred from the transfer die to the drying die, or simultaneously therewith, suction or vacuum is applied to the transfer ring cylinder which lifts the transfer die ring 49 to the position shown in Figure 13, and an instant after this occurs, or simultaneously therewith, compressed air is introduced into the chamber of the transfer die to eject the article therefrom and deposit it on the drying die, as shown in Figure 14.

Immediately thereafter the cam 312 elevates the transfer shaft 61 to lift the transfer die away from the drying die 90, leaving the article on the latter.

Figure 15:
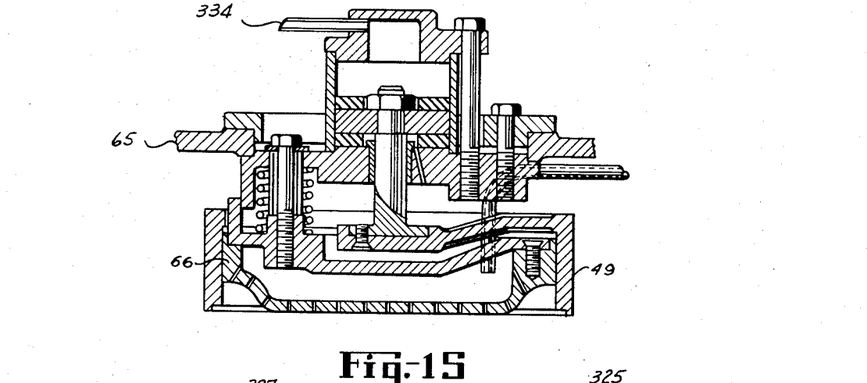
Figure 15 shows the transfer die at station I of Figure 2, with the transfer reshaping ring lowered for inspection purposes.

As soon as the transfer die has been fully elevated, the Geneva movement acts to step the transfer arm 65 through a further 90 degrees of rotation to bring the transfer die (which has just discharged the article) to station I. At this station, the cylinder will be vented to the atmosphere through the pipe 334, the port whereof in the rotatable valve 316 registers with the port of the pipe 327 in the fixed valve 318. As soon as the cylinder is vented, the reshaping ring of the transfer die will, if the parts are functioning properly, drop by gravity, as shown in Figure 15.

In the operation of a machine such as this, pulp fibers will occasionally accumulate between the upper reshaping ring 49 and the transfer die, causing it to bind. By liberating this ring to the force of gravity at station I, the operator of the machine, by glancing at the dies from time to time as they leave this position, can readily detect such accumulations by noting failure of the reshaping ring to return to its proper position (i. e., drop by gravity) and necessary cleaning may be immediately undertaken so that this ring will function properly. This visual check on the operation of the apparatus will preclude undue strain on the operating parts by permitting immediate detection of the accumulations referred to.

After the cylinder has been vented at station I, as stated, the Geneva movement operates to step the transfer die to station F, as shown in Figure 3 and the operations described are repeated.

It is to be understood that, while the operations described are being carried out with one of the transfer dies, like operations are being performed by the three other transfer dies but spaced apart 90 degrees in the cycle, so that there is, during the operation of the machine, one transfer die picking up an article from the forming die at station F while another is reshaping another article at station R, while still another is delivering another reshaping article to a drying die at station D and the ring of the fourth transfer die is being lowered for inspection at station I. This sequence of steps of the several transfer dies in succession is carried out in repetitive cycles of operation of the machine to effect a continuous flow of articles from the dies on which they are formed to the dies on which they are dried, with an interposed reshaping operation.

Figure 16:
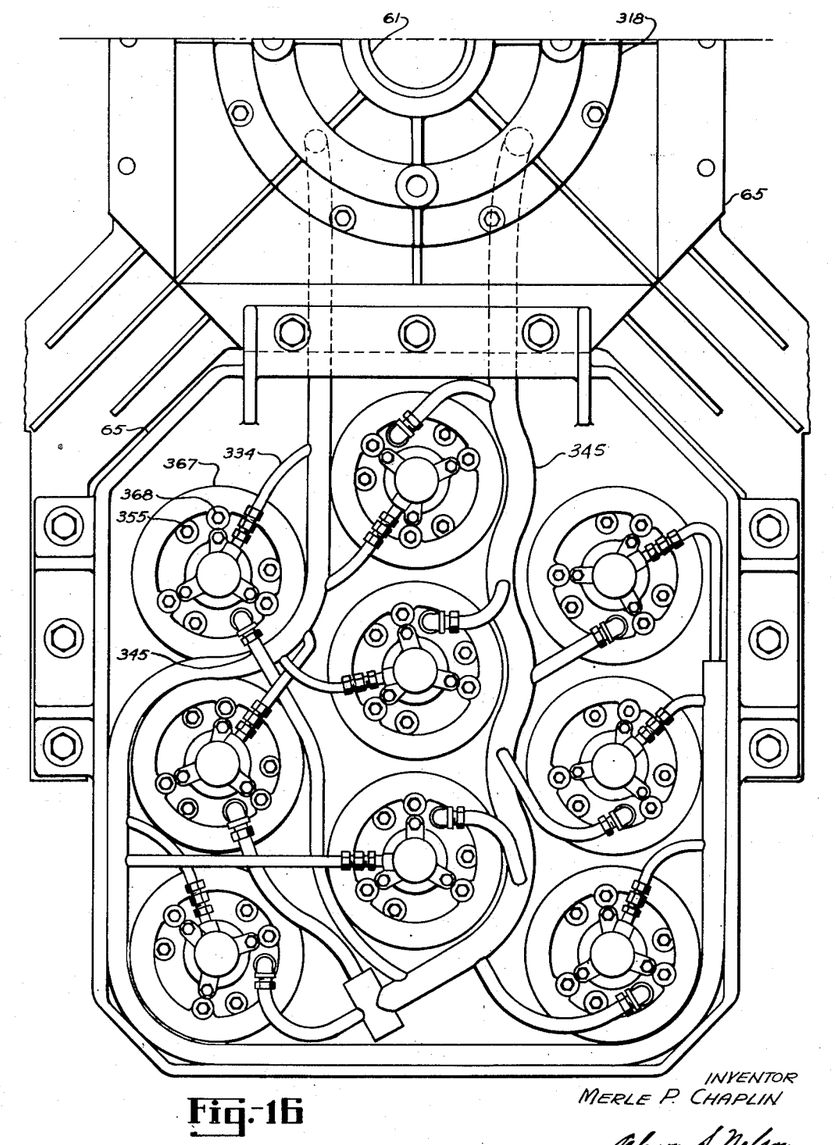
Figure 16 shows a multiple transfer die mounting arrangement with pneumatic connections for transferring and reshaping a plurality of article blanks simultaneously.

The foregoing description has dealt with the employment of a transfer die assembly having a single transfer die on each of the four arms 65. However, it is possible and entirely practical to mount a transfer die assembly having a plurality of transfer dies on each of these arms, as indicated in Figure 16. In this figure, nine separate transfer dies are mounted on each arm 65 with the pneumatic cylinder of each of these dies connected to a branch of pipe 334, while a corresponding number of branches of pipe 345 connect to the chambers of the several transfer dies. With such an arrangement, it will of course be understood that the forming drum of the forming unit should have forming dies similarly placed to deliver nine formed article blanks simultaneously to these nine transfer dies, while the drying unit should have a like number of drying dies at each station to receive nine reshaped pulp articles. The operation and control of the nine dies shown is the same as described with respect to the single transfer die and does not require any valve changes or other modification.

This multiple arrangement enables a large number of articles to be simultaneously operated upon through contemporaneous operation of a large number of dies with their reshaping rings controlled as a single operating unit.

The operation of the parts and their pneumatic control in the manner hereinbefore described very materially simplifies my prior constructions. The pneumatic control of the transfer dies makes it possible to accomplish, with simple valve mechanisms and relatively little piping, operations which, if wholly mechanically carried out, would not only add considerable weight to the machine, but would raise maintenance difficulties because of lost motion and other undesirable conditions which are entirely overcome by the simple construction which I have described. Experience with this machine has shown that its operation is unfailing, smooth and reliable and has permitted marked economies in building and maintenance.

The foregoing detailed description sets forth the invention in its preferred practical form but the invention is to be understood as fully commensurate with the appended claims.

Having thus fully described the invention, what I claim as new and desire to secure by Letters Patent is:

1. A pulp article transfer and reshaping unit comprising: a rotatable vertical transfer shaft, a plurality of transfer dies carried by said shaft and arranged in spaced annular sequence about the same, a reshaping ring embracing each die and axially movable with respect thereto, a pneumatic cylinder positioned above each die and rotatable with the die about said shaft, a piston in each cylinder connected to the reshaping ring thereof to axially move the ring when plus or minus atmospheric pressures are applied to the cylinder, a cam shaft, means for driving the cam shaft at a constant speed and the transfer shaft intermittently in timed relation thereto to position the several transfer dies in succession at selected stations with a period of dwell at each station, cooperating valve members, one of which is rotatable with the transfer shaft and the other of which is fixed, said valve members having ports registering with one another when the dies are at the several stations, a pneumatic duct from the cylinder of each die to one of the ports of the movable valve member, and pneumatic ducts from ports of the fixed valve member for connection to sources of plus and minus atmospheric pressures, said latter ducts including control valves operable by cams on the cam shaft to selectively communicate plus and minus atmospheric pressures to the cylinders of the respective transfer dies appropriate to their individual location at the several stations, and means for raising and lowering the transfer shaft while said dies are at said stations.

2. A pulp article transfer and reshaping unit according to claim 1 wherein there is positioned at one of said stations a fixed reshaping die embraced by a reshaping ring to cooperate with the reshaping ring of a transfer die at said station, and means for operating the ring of the fixed reshaping die in timed relation to the operations of the ring of the cooperating transfer die.

3. A pulp article transfer and reshaping unit according to claim 1 wherein there is positioned at one of said stations a fixed reshaping die embraced by a reshaping ring to cooperate with the reshaping ring of a transfer die at said station, and operative connections between said cam shaft and the ring of the fixed reshaping die for operating the latter ring in timed relation to the operations of the ring of the cooperating transfer die.

4. A pulp article transfer and reshaping unit comprising: a rotatable vertical transfer shaft carrying a plurality of transfer die assemblies arranged in spaced annular sequence about said shaft and rotatable therewith, means for intermittently rotating said thaft to move each die assembly to a position of rest at predetermined pick-up, reshaping, discharging and inspection stations in succession, means for raising and lowering the shaft to correspondingly move the die assemblies while the dies are at rest at said stations, each die assembly embodying at least one transfer die, a reshaping ring embracing such die, and a pneumatic cylinder having therein a piston connected to said ring to raise and lower the ring with respect to the die while such die is positioned at a station, in combination with ducts for connection of sources of plus and minus atmospheric pressures to the cylinders of the several die assemblies, and valves included in said ducts and operable in timed relation with the movements of the transfer shaft to produce plus and minus atmospheric pressures within the cylinders of the several dies to operate the reshaping rings while at said stations.

5. A pulp article transfer and reshaping unit according to claim 4 wherein a vent passage is provided at the inspection station to there register with the duct of a cylinder at said station for there venting the cylinder of each die assembly to the atmosphere to liberate the ring of such die at said station to the force of gravity.

6. A pulp article transfer and reshaping unit comprising: a transfer die assembly rotatable along a fixed path to and from annularly spaced apart stations in succession with a period of rest at each station, said die assembly embodying a transfer die and a pneumatic cylinder having therein a piston operatively connected to a reshaping ring embracing said die and movable axially of the die by said piston, a fixed valve member having ports for connection by supply ducts to sources of plus and minus atmospheric pressures, a coacting selector valve member with a port having a feed duct connection with the pneumatice cylinder and rotatable with the die to selectively connect said feed duct to appropriate supply ducts when the die assembly is at rest at any particular station, control valves included in the supply ducts, and means for operating said valves in timed relation to movements of the die to admit plus and minus atmospheric pressures to said supply ducts while the supply and feed ducts are connected with one another.

7. A pulp article transfer and reshaping unit comprising: a transfer die assembly embodying a transfer die, and a pneumatic cylinder having therein a piston connected to a reshaping ring embracing the die to move the ring axially of the die, a shaft supporting said die assembly for travel along an annular path to and from a plurality of annularly spaced apart stations, means to impart intermittent movement to said die assembly along said path with periods of rest at the several stations, a fixed reshaping die at one of said stations with which the transfer die is in spaced superimposed relation when at such station, a reshaping ring embracing said fixed reshaping die, means for lowering the transfer die into coacting relation with the fixed die at such station and for thereafter elevating said transfer die, means for admitting compressed air into the cylinder of the transfer die to move the ring thereof downwardly while said dies are in coacting relation, and means for thereupon elevating the ring of the fixed die.

8. A pulp article transfer and reshaping unit comprising: a transfer die assembly embodying a transfer die embraced by a reshaping ring movable axially of said die, means for intermittently moving said die through an endless path to positions of rest at predetermined pick-up, reshaping and discharge stations in succession, a fixed reshaping die at the reshaping station also embraced by a reshaping ring movable axially of the fixed die, said fixed reshaping die being located beneath and in spaced vertical alinement to the transfer die when the latter is at the reshaping station, means for lowering the transfer die to coact with the fixed die while they are thus alined, pneumatic means including a pneumatic cylinder and a control valve for lowering the ring of the transfer die while the dies are in coacting relation, and means for thereupon elevating the ring of the fixed die while the dies remain in coacting relation.

References Cited in the file of this patent

UNITED STATES PATENTS

| Number | Name | Date |
|---|---|---|
| 448,748 | Comings | Mar. 24, 1891 |
| 891,642 | Tietzmann | June 23, 1908 |
| 1,158,635 | Chaplin | Nov. 2, 1915 |
| 1,201,502 | Roberts | Oct. 17, 1916 |
| 1,482,707 | Skinner | Feb. 5, 1924 |
| 1,969,323 | Person | Aug. 7, 1934 |
| 2,251,477 | Wisman | Aug. 5, 1941 |
| 2,257,573 | Randall | Sept. 30, 1941 |
| 2,296,744 | Simmons | Sept. 22, 1942 |
| 2,307,022 | Chaplin | Jan. 5, 1943 |
| 2,346,608 | Randall | Apr. 11, 1944 |
| 2,388,828 | Chaplin | Nov. 13, 1945 |
| 2,408,734 | Chaplin | Oct. 8, 1946 |
| 2,446,649 | Gregory | Aug. 10, 1948 |
| 2,547,275 | Lyon | Apr. 3, 1951 |